UNITED STATES PATENT OFFICE.

FRANCIS BAKER, OF NEW YORK, N. Y.

IMPROVEMENT IN MEDICAL COMPOUNDS FOR CURE OF CANCER AND OTHER DISEASES.

Specification forming part of Letters Patent No. 116,530, dated June 27, 1871.

*To all whom it may concern:*

Be it known that I, FRANCIS BAKER, of New York, in the county of New York and State of New York, have invented a new and Improved Medical Compound for the Cure of Cancer and other diseases of the blood; and I do hereby declare the following to be a full, clear, and exact description of the same:

This compound consists of the following ingredients, viz.: Cundurango-wood, ground with the bark on, one-half ounce; water, four ounces; Jamaica rum, or its equivalent, one ounce; ground cloves, four grains; sugar, six grains.

The method of compounding is as follows: Boil the ground cundurango-wood and bark in the specified quantity of water half an hour, or until the water assumes a light claret color; strain off the water, and add the rum, cloves, and sugar.

Having thus described my invention, what I claim as new, and desire to secure by Letters Patent, is—

The compound herein set forth, composed of the ingredients specified.

Witnesses:              FRANCIS BAKER.
    THOS. D. D. OURAND,
    C. A. PETTIT.